United States Patent
Fujita

(10) Patent No.: US 6,864,885 B2
(45) Date of Patent: Mar. 8, 2005

(54) GRAPHIC FORM CORRECTION METHOD AND APPARATUS FOR CAD SYSTEM

(75) Inventor: Shigehisa Fujita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 191 days.

(21) Appl. No.: 09/820,993

(22) Filed: Mar. 30, 2001

(65) Prior Publication Data

US 2001/0026273 A1 Oct. 4, 2001

(30) Foreign Application Priority Data

Mar. 31, 2000 (JP) ........................................ 2000-098295

(51) Int. Cl.$^7$ ............................................. G06T 17/00
(52) U.S. Cl. ........................................ 345/420; 345/964
(58) Field of Search .................................. 345/420, 964

(56) References Cited

U.S. PATENT DOCUMENTS 5,999,186 A * 12/1999 Jackson ........................ 345/420
6,256,595 B1 * 7/2001 Schwalb et al. ................ 703/1

FOREIGN PATENT DOCUMENTS

JP           A5165902         7/1993
JP           A5-165902      * 7/1993

OTHER PUBLICATIONS

SolidWorks 98 Plus, 1998, SolidWorks, p. 9–24.*

* cited by examiner

*Primary Examiner*—Mark Zimmerman
*Assistant Examiner*—Enviguel L Santiago
(74) *Attorney, Agent, or Firm*—Birch, Stewart, Kolasch & Birch, LLP

(57) ABSTRACT

A graphic form correction apparatus and method for a CAD system wherein a display position of a dimension-relating symbol such as a dimension line, an extension line or a dimension value entered on a two-dimensional graphic form is automatically corrected in response to a correction of the two-dimensional graphic form. The graphic form correction apparatus includes an additional symbol arrangement section for arranging an additional symbol such as a finish symbol or a surface roughness in the proximity of the dimension-relating symbol, and an additional symbol position storage section for storing a display position of the additional symbol and a display position of the dimension-relating symbol in a coordinated relationship. When the display position of the dimension-relating symbol is corrected in response to the correction of the two-dimensional graphic form, an additional symbol position correction section for correcting the display position of the additional symbol based on the display position of the dimension-relating symbol after the correction is also provided. Therefore, when a graphic form is corrected or moved, an additional symbol such as a finish symbol is automatically moved in response to the correction or movement of the graphic form so that the additional symbol is redisplayed at a proper position.

10 Claims, 8 Drawing Sheets

FIG. 13

| Type | Contents | Coordinates | |
|---|---|---|---|
| | | Start point | End point |
| Extension line Lb | | $(x_1, y_1)$ | $(x_1, y_3)$ |
| Extension line Lc | | $(x_6, y_1)$ | $(x_6, y_3)$ |
| Dimension line La | Double-sided arrow mark | $(x_1, y_3)$ | $(x_6, y_3)$ |
| Dimension value | 60.0 | $(x_3, y_5)$ | $(x_4, y_3)$ |

| Type | Contents | Coordinates | |
|---|---|---|---|
| | | Start point | End point |
| Finish symbol | ▽▽▽ | $f_s(x_1, x_6, y_3, y_3)$ | $f_e(x_1, x_6, y_3, y_3)$ |

24

GRAPHIC FORM CORRECTION METHOD AND APPARATUS FOR CAD SYSTEM

BACKGROUND OF THE INVENTION

1. Field of the Invention

The present invention relates to a graphic form correction method and an apparatus for a CAD (Computer-Aided Design) system, and more particularly to a graphic form correction method and an apparatus for a CAD system wherein display positions of various symbols displayed incidentally to individual portions of a two-dimensional graphic form are automatically corrected in response to correction of the graphic form.

2. Background Art

Even if dimension lines and dimension values are arranged at different portions of a two-dimensional graphic form produced by a CAD system, if the graphic form is corrected, then the dimension lines and the dimension values of them are brought out of a coordinated relationship with the graphic form after the correction.

On a CAD drawing, in addition to dimension lines and extension lines or dimension values, additional symbols such as finish symbols and welding symbols are arranged in the proximity of line segments or dimension lines.

FIGS. 15(a)–15(c) are views of individual steps of a conventional graphical form undergoing a correction process. As shown in FIG. 15(a), extension lines Lb and Lc and a dimension line La, a dimension value "60.0" and a finish symbol "ΔΔΔ" are displayed on a graphic form F in a state before correction.

If an operator makes the height of the graphic form F lower to deform the graphic form F into another graphic form F' as shown in FIG. 15(b), then the extension lines Lb and Lc, dimension line La and dimension value "60.0" move downwardly together with the graphic form F' after the correction as shown FIG. 15(c).

However, since the display position of the finish symbol "ΔΔΔ" is not coordinated with the dimension line La and so forth, it remains at its position before the correction. Accordingly, the operator must move the finish symbol "ΔΔΔ" by manual operation.

SUMMARY OF THE INVENTION

The present invention overcomes the shortcomings associated with conventional devices and achieves other advantages not realized by conventional devices.

In order to solve this problem, a CAD system is proposed wherein, if a graphic form with which dimension lines and dimension values are displayed is corrected, then the positions and the lengths of the dimension lines as well as values of the dimension values and the display positions of them are automatically corrected in accordance with the new graphical form after the correction.

It is an aspect of the present invention to provide a graphic form correction method and an apparatus for a CAD system wherein if a graphic form is corrected or moved, then an additional symbol(s) such as a finish symbol is automatically moved in response to the correction or movement of the graphic form so that the additional symbol is re-displayed at a proper position.

These and other aspects of the present invention are accomplished by a graphic form correction apparatus for a CAD system wherein a display position of a dimension-relating symbol entered on a two-dimensional graphic form is automatically corrected and creates a corrected display position in response to a two-dimensional corrected graphic form comprising means for arranging an additional symbol in the proximity of the dimension-relating symbol; means for storing a display position of the additional symbol and a display position of the dimension-relating symbol in a coordinate relationship; and means for correcting the display position of the additional symbol based on the corrected display position of the dimension-relating symbol after the two-dimensional corrected graphic form.

With the characteristic described above, if the display position of a dimension-relating symbol is automatically corrected in response to correction of a graphic form, then the display position of an additional symbol such as a finish symbol or a surface roughness is automatically corrected in response to the automatic correction. Therefore, position correction of the additional symbol by manual operation is no longer necessary.

These and other aspects of the present invention are further accomplished by a graphic form correction method for a CAD system wherein a display position of a dimension-relating symbol entered on a two-dimensional graphic form is automatically corrected and creates a corrected display position in response to a two-dimensional corrected graphic form, said method comprising the steps of creating a corrected display position of the dimension-relating symbol; arranging an additional symbol in the proximity of the dimension-relating symbol; storing a display position of the additional symbol and a display position of the dimension-relating symbol in a coordinate relationship; and correcting the display position of the additional symbol based on the corrected display position of the dimension-relating symbol after the two-dimensional corrected graphic form.

These and other aspects of the present invention are further accomplished by a graphic form correction apparatus for a CAD system wherein a display position of a dimension-relating symbol entered on a two-dimensional graphic form is automatically corrected and results in a corrected display position in response to a two-dimensional corrected graphic form, said apparatus comprising a display section;

an internal storage apparatus storing a main operating program and a plurality of image data; a CPU and a user interface; a ROM and a RAM; and an additional symbol arrangement section in the proximity of the dimension-relating symbol; a display position storage section storing the additional symbol and a display position of the dimension-relating symbol in a coordinate relationship; and a display position correction section responsive to the corrected display position of the dimension-relating symbol after the two-dimensional corrected graphic form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 is a schematic view representing storage contents of dimension-relating symbol position storage means according to an embodiment of the present invention;

FIG. 14 is a schematic view representing storage contents of additional symbol position storage means according to an embodiment of the present invention.

BRIEF DESCRIPTION OF THE PREFERRED EMBODIMENTS

Figure 1:
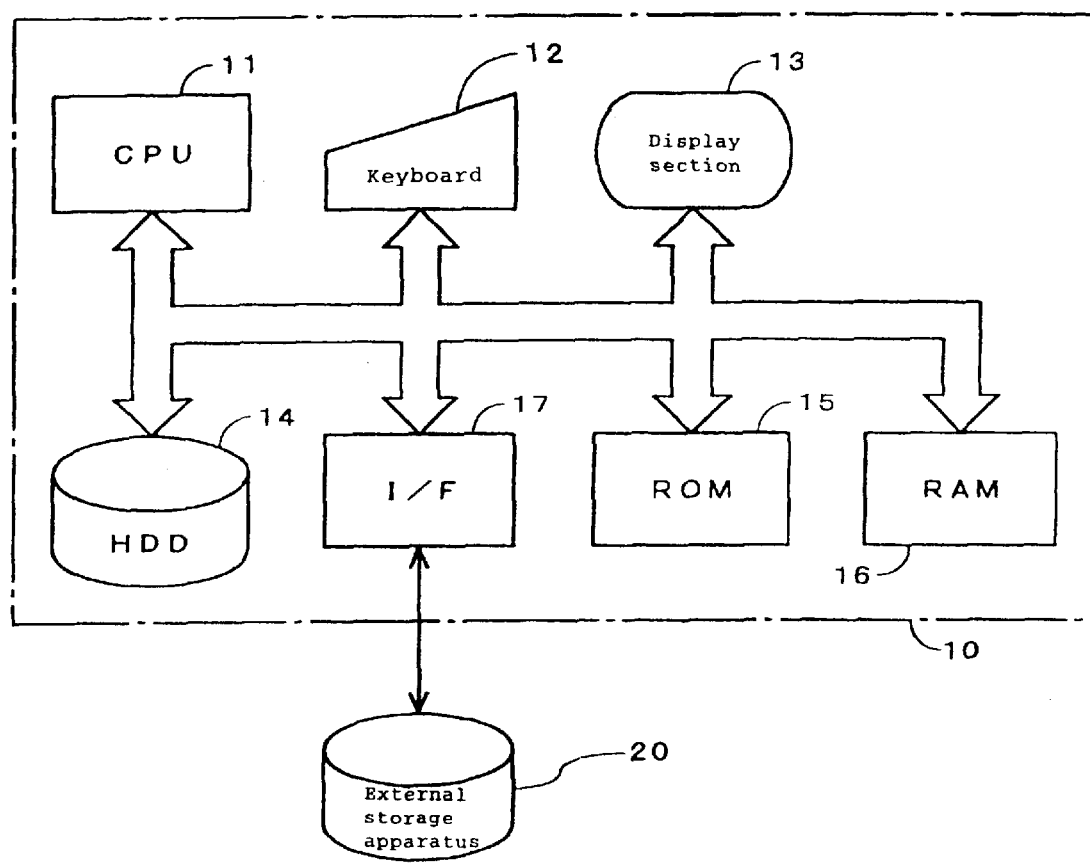
FIG. 1 is a block diagram showing a construction of a CAD system incorporating a graphic form correction method and an apparatus according to an embodiment of the present invention.

In the following, the present invention is described in detail with reference to the drawings. FIG. 1 is a block diagram of a CAD system incorporating the present invention. The CAD system 10 includes a CPU 11, a keyboard 12 and a display section 13 which serve as man/machine interfaces, and an internal storage apparatus (HDD) 14 on which a main program and image data of the CAD system 10 are stored. The CAD System further includes a ROM 15 in which reference data and so forth are stored, a RAM 16 which functions as a work area of the CPU 11, an external interface 17, and an external storage apparatus 20 connected through the external interface 17.

It is to be noted that the form of utilization of the internal storage apparatus 14 and the external storage apparatus 20 is not limited to that described above, and the storage apparatus that should be selected as a destination of storage of a program or data can be set and changed arbitrarily.

Figure 2:
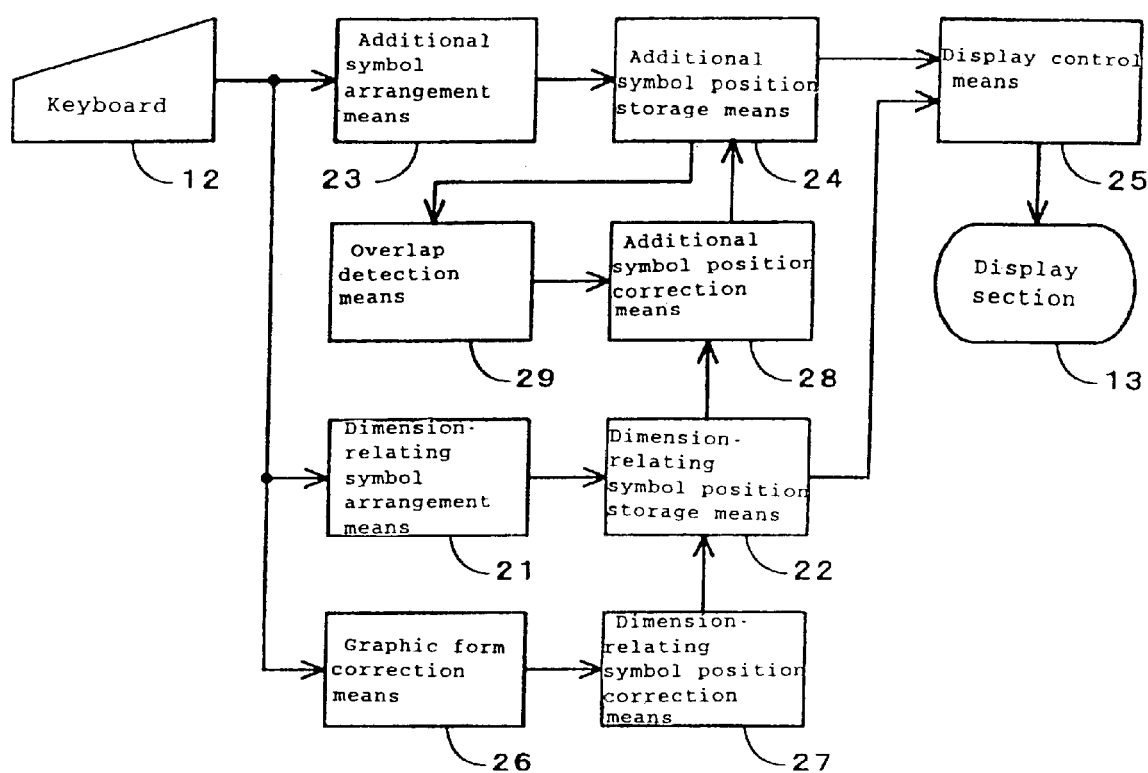
FIG. 2 is a functional block diagram of an embodiment of the present invention.

FIG. 2 is a functional block diagram of an embodiment of the present invention. FIG. 2 shows processes which are executed in accordance with a program and the data stored in the internal storage apparatus 14 or the external storage apparatus 20 by the CPU 11.

A dimension-relating symbol arrangement section 21 arranges dimension-relating symbols such as an extension line, a dimension line and a dimension value for each line segment of a graphical form displayed on the display section 13 in response to an operation of an operator detected by the keyboard 12 or a mouse. Display positions of the thus arranged dimension-relating symbols are stored into a dimension-relating symbol position storage section 22.

An additional symbol arrangement section 23 arranges an additional symbol such as a finish symbol or a surface roughness in the proximity of each line segment-relating symbol displayed on the display section 13 in response to an operation of the operator detected by the keyboard 12 or the mouse. Display positions of the arranged additional symbols are stored into an additional symbol position storage section 24.

A display control device 25 controls the display section 13 to display the individual symbols based on the display positions of the dimension-relating symbols and the additional symbols stored in the dimension-relating symbol position storage section 22 and the additional symbol position storage section 24.

A graphic form correction section 26 corrects or deforms the graphic form displayed on the display section 13 in response to an operation of the operator detected by the keyboard 12 or the mouse.

A dimension-relating symbol position correction section 27 corrects the display positions of the dimension-relating symbols stored in the dimension-relating symbol position storage section 22 in response to the shape of the graphic form after the correction or deformation.

When the display positions of the dimension-relating symbols are automatically corrected in response to the correction of the graphic form, an additional symbol position correction section 28 corrects the display positions of the additional symbols based on the display positions of the dimension-relating symbols after the correction.

An overlap detection section 29 supervises the presence or absence of an overlap in display of any additional symbol whose display position has been corrected, with an additional symbol or a dimension-relating symbol. If the overlap detection section 29 detects an overlap in display position, then it instructs the additional symbol position correction section 28 to correct the display position of the additional symbol.

Figure 3:
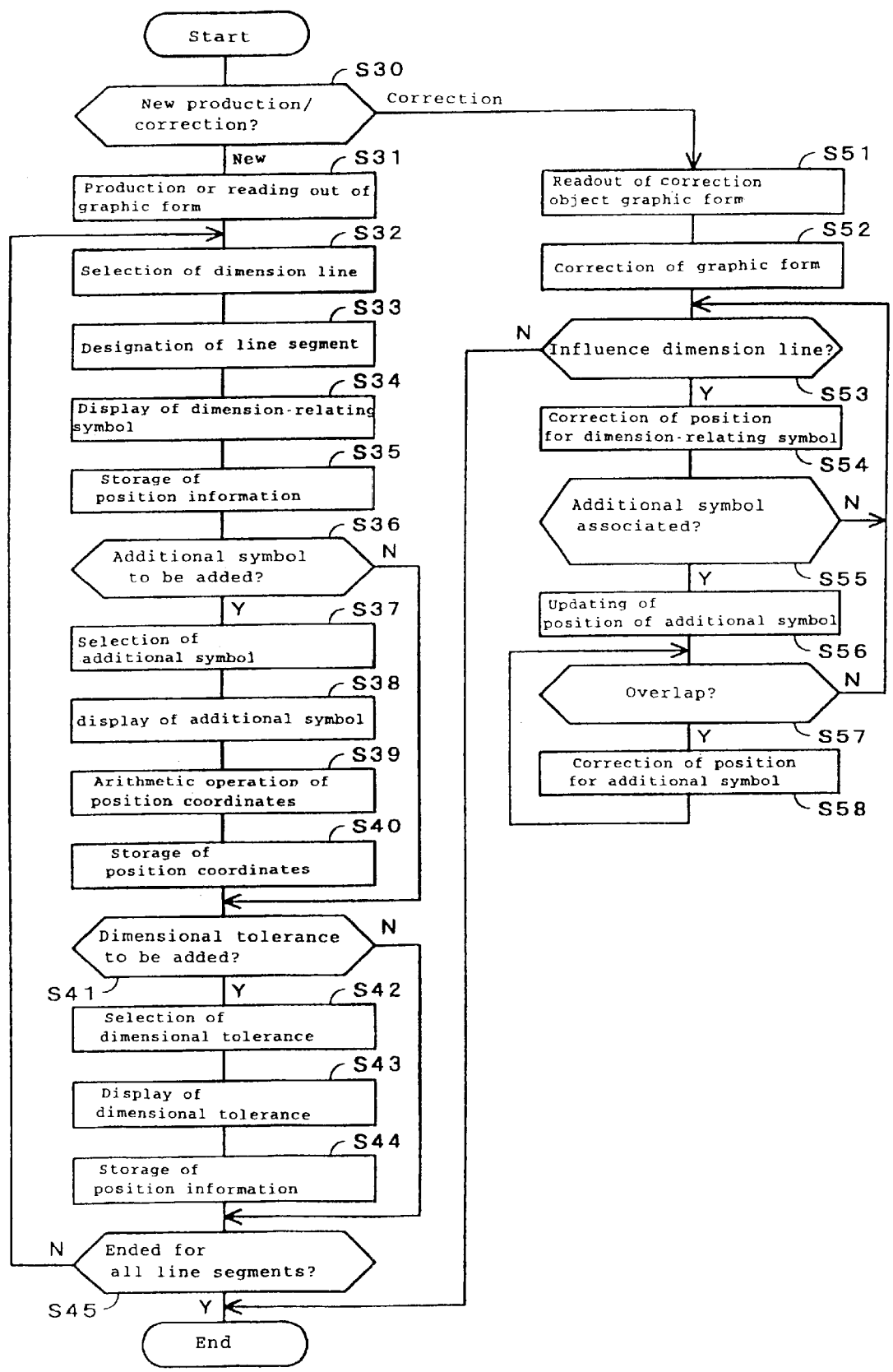
FIG. 3 is an operational flow chart according to an embodiment of the present invention.
Figure 4:
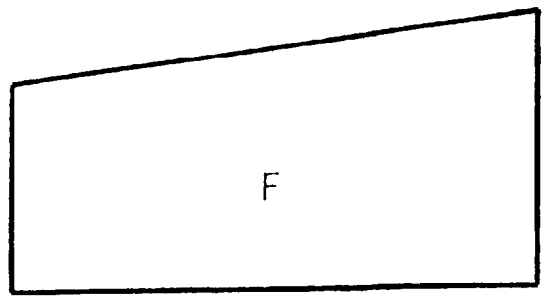
FIG. 4 is a screen view showing a screen display (part 1) according to an embodiment of the present invention.

Now, operation of an embodiment is described with reference to the flow chart of FIG. 3. In step S30, either new production or correction of a graphic form is selected by an operator. If the new production is selected, then in step S31, either a new two-dimensional graphic form F is produced or a two-dimensional graphic form F already produced is read out from the external storage apparatus 20 and is displayed on a screen of the display section 13 as shown in FIG. 4.

Figure 5:
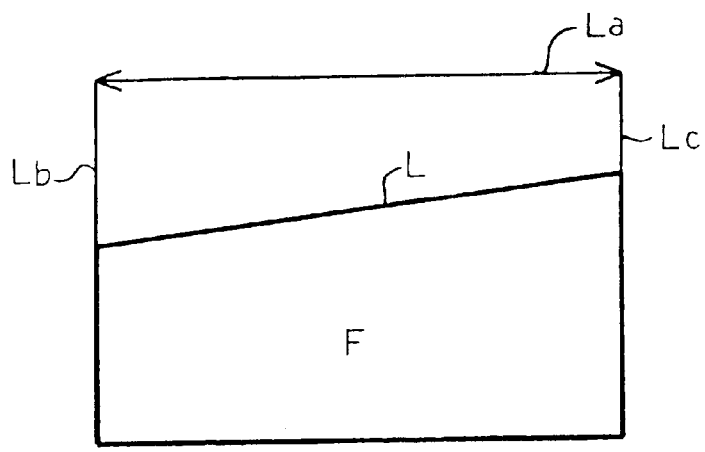
FIG. 5 is a screen view showing a screen display (part 2) according to an embodiment of the present invention.

In step S32, the operator selects a single-sided arrow mark, a double-sided arrow mark or some other mark as a type of a dimension line. In step S33, the operator designates a line segment L, for which a dimension line is to be entered, on the graphic form F. Then in step S34, extension lines Lb and Lc and a dimension line La are displayed at predetermined positions corresponding to the designated line segment L as shown in FIG. 5 by the dimension-relating symbol arrangement section 21.

Figure 6:
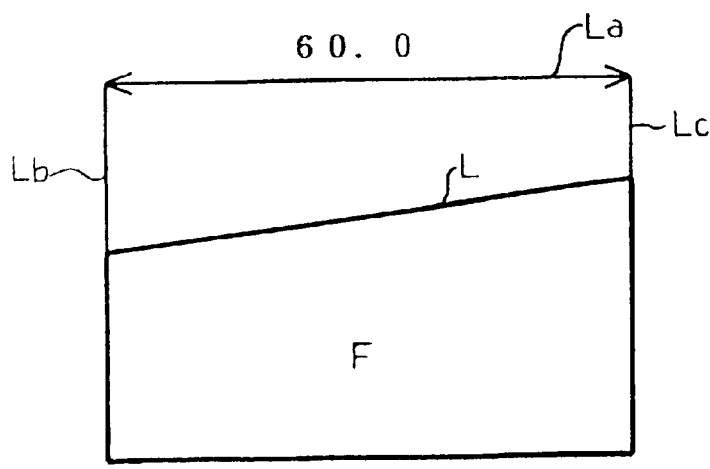
FIG. 6 is a screen view showing a screen display (part 3) according to an embodiment of the present invention.

Further, a dimension value, e.g. "60.0" for the line segment L is displayed at a predetermined position by the dimension-relating symbol arrangement section 21 as shown in FIG. 6. In step S35, display positions of the extension lines, the dimension line and the dimension value of the dimension line are stored into the dimension-relating symbol position storage section 22.

Figure 12:
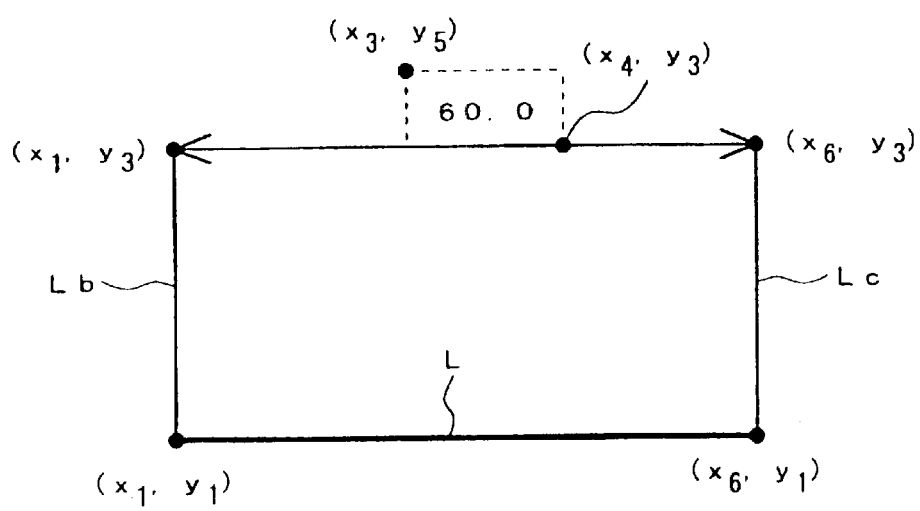
FIG. 12 is a view showing an example of a screen display (part 9) according to an embodiment of the present invention.
Figure 15A:
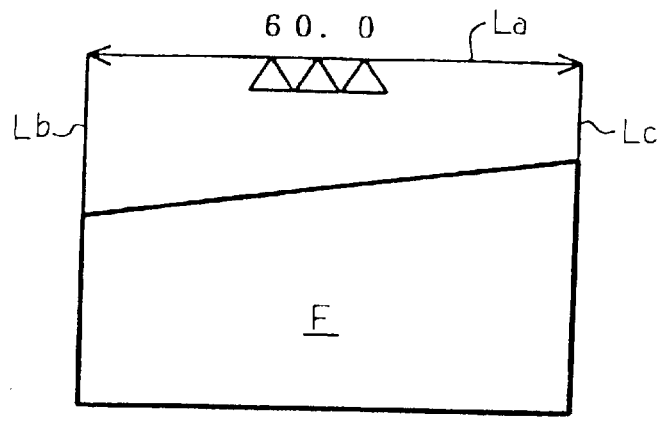
FIGS. 15(a)–15(c) are views of individual steps of a graphical form undergoing a correction process in a conventional CAD system.
Figure 15B:
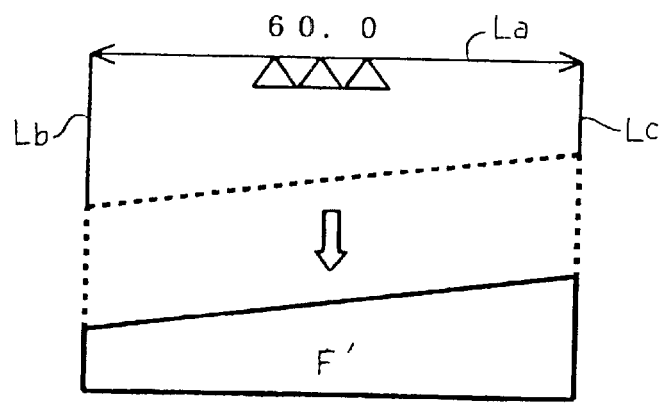
Figure 15C:
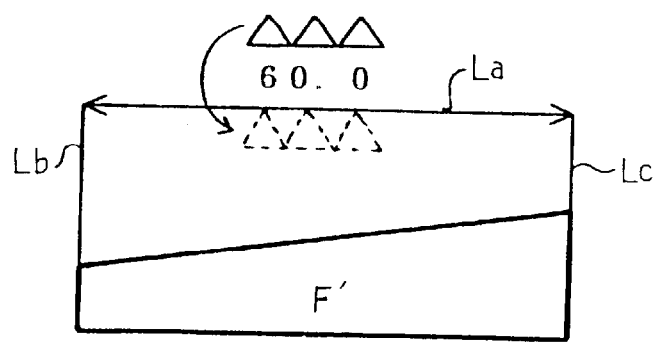

FIG. 12 is a view showing an example of a screen display (part 9) according to an embodiment of the present invention. FIG. 12 shows in an enlarged scale a display example of the extension lines, dimension line and dimension value. FIG. 13 is a schematic view representing storage contents of dimension-relating symbol position storage means according to an embodiment of the present invention. FIG. 13 illustrates storage contents of the dimension-relating symbol position storage section 22 in the display example.

In the storage section 22, contents and position coordinates of dimension-relating symbols are stored for each type of the dimension-relating symbols. The position coordinates are stored as start point coordinates and end point coordinates of a region in which the dimension-relating symbols are displayed.

In step S36, the operator selects whether or not an additional symbol such as a finish symbol or a surface roughness should be entered, and if an additional symbol should be entered. Then the operator selects an additional symbol in step S37.

Figure 7:
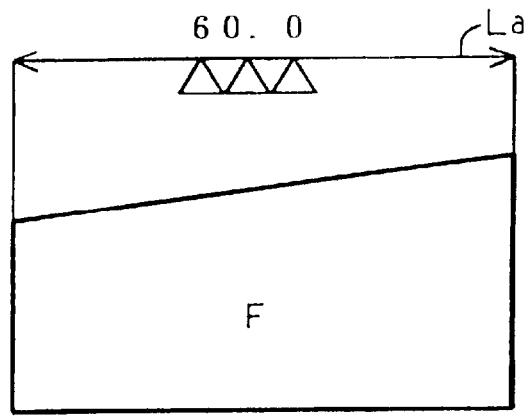
FIG. 7 is a screen view showing a screen display (part 4) according to an embodiment of the present invention.

In step S38, the additional symbol selected as described above (here a finish symbol "ΔΔΔ") is arranged at a predetermined position on the dimension line La by the additional symbol arrangement section 23 as shown in FIG. 7. In step S39, position coordinates of the finish symbol are arithmetically operated as a function of the position coordinates of the dimension line La, and the position coordinates are stored into the additional symbol position storage section 24 in step S40.

FIG. 14 is a schematic view representing storage contents of additional symbol position storage means according to an embodiment of the present invention. FIG. 14 illustrates storage contents of the additional symbol position storage section 24, and for each of type of finish symbols, contents and position coordinates of the finish symbol are registered.

The position coordinates are represented as start point coordinates and end point coordinates of the region in which the finish symbol is displayed, and are given as functions $fs(x1, x6, y3, y3)$ and $fe(x1, x6, y3, y3)$ of start point coordinates $(x1, y3)$ and end point coordinates $(x6, y3)$ of the dimension line La, respectively.

It is to be noted that, while, in the present embodiment, it is described that the object with which the display position of the additional symbol is coordinated is the dimension line La, it may be coordinated with the line segment L.

In step S41, it is determined if a dimensional tolerance should be entered. If a dimensional tolerance should be entered, then in step S42, a recommendable tolerance set prescribed in the JIS corresponding to the dimension value of the dimension line is displayed in a list on the screen of the display section 13. A desired tolerance is then selected by the operator.

In step S43, the tolerance selected by the operator is displayed at a predetermined position in the proximity of the dimension value. In step S44, the display position is registered together with the dimension-relating symbols into the dimension-relating symbol position storage section 22. It is to be noted that, in the present embodiment, the dimensional tolerance is not shown.

The selection and the display of such dimension-relating symbols, additional symbols, tolerance and so forth described above are performed for each line segment of the produced graphic form. If it is determined in step S45 that the processing for all line segments is completed, then the new production process is ended.

On the other hand, if correction of a graphic form is selected in step S30 described above, then in step S51, the graphic form F produced and stored in advance is read out from the external storage apparatus 20 and is displayed on the screen of the display section 13 as shown in FIG. 7.

Figure 8:
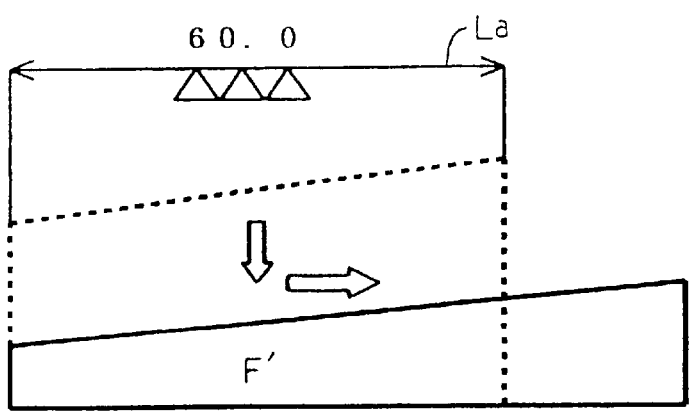
FIG. 8 is a screen view showing a screen display (part 5) according to an embodiment of the present invention.
Figure 9:
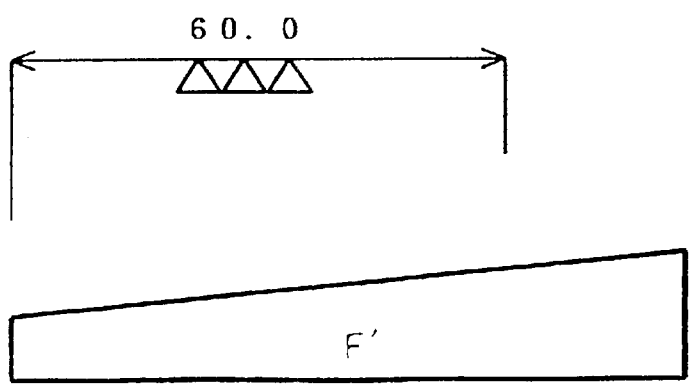
FIG. 9 is a screen view showing a screen display (part 6) according to an embodiment of the present invention.

In step S52, the operator operates the keyboard 12 or the mouse to correct or deform the graphic form to a desired shape as shown in FIG. 8 or 9.

In step S53, it is determined if there is a dimension line which is influenced by the current correction of the graphic form. If there is a dimension line which is influenced, then in step S54, the display positions of any dimension line which is influenced and an extension line and a dimension value of the dimension line are corrected by the dimension-relating symbol position correction section 27. The position coordinates are updated in the dimension-relating symbol position storage section 22.

Figure 10:
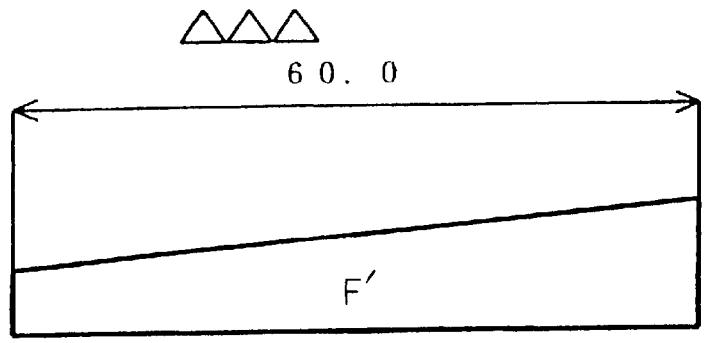
FIG. 10 is a screen view showing a screen display (part 7) according to an embodiment of the present invention.

As a result, the dimension-relating symbols are moved in response to the graphic form F' after the correction as shown in FIG. 10.

Figure 11:
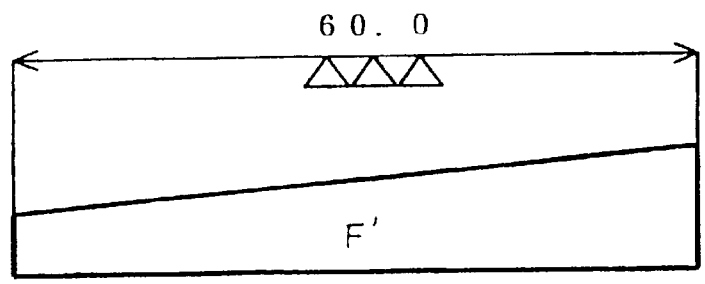
FIG. 11 is a screen view showing a screen display (part 8) according to an embodiment of the present invention.

In step S55, it is determined if an additional symbol is associated with the moved dimension-relating symbols. If an additional symbol is associated, then the position coordinates of the additional symbol stored in the additional symbol position storage means 24 are updated by the additional symbol position correction means 28 in step S56. As a result, the finish symbol "ΔΔΔ" is moved in response to the shape of the graphic form after the correction as shown in FIG. 11.

In other words, in the present embodiment, since the position coordinates of the additional symbol are stored as a function of the position coordinates of the dimension line La as illustrated also in FIG. 14, if the position coordinates of the dimension line La after the movement are substituted into the function, then the additional symbol is automatically re-arranged to a predetermined position corresponding to the dimension line La after the movement.

According to the present embodiment, if a display position of a dimension-relating symbol is automatically corrected in response to correction of a two-dimensional graphic form, then the display position of an additional symbol such as a finish symbol or a surface roughness is automatically corrected in response to the correction of the display position of the dimension-relating symbol. Therefore, position correction of the additional symbol by manual operation is no longer necessary.

In step S57, it is supervised by the overlap detection section 29 to determine if the display position of the additional symbol after the movement overlaps with the display position of some other additional symbol or dimension-relating symbol. If the display position overlaps, then a position correction instruction of the additional symbol is issued from the overlap detection section 29 to the additional symbol position correction section 28.

In step S58, the additional symbol position correction section 28 corrects the position of the additional symbol to eliminate the overlap.

According to the embodiments of the present invention, the following advantageous effects are achieved. If the display position of a dimension-relating symbol is automatically corrected in response to the correction of a two-dimensional graphic form, then the display position of an additional symbol such as a finish symbol or a surface roughness is also automatically corrected in response to the correction of the display position. Therefore, position correction of the additional symbol by manual operation is no longer necessary.

Since an overlap detection section is provided so that the position of the additional symbol after the movement can be corrected, even if the additional symbol after the movement should overlap with some other additional symbol or dimension-relating symbol, such an overlap can be eliminated with the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A graphic form correction apparatus for a CAD system wherein a display position of a dimension-relating symbol in a coordinate relationship to a line segment being entered on a two-dimensional graphic form is automatically corrected and creates a corrected display position in response to a two-dimensional corrected graphic form, said graphic from correction apparatus comprising:

means for arranging an additional symbol separate from and in the proximity of the dimension-relating symbol, wherein said additional symbol is not a dimension-relating symbol;

means for storing both the display position of the additional symbol and the display position of the dimension-relating symbol in the coordinate relationship with the line segment;

means for correcting the display position of the additional symbol based on the corrected display position of the dimension-relating symbol after the the display position of the dimenasion-relating symbol being corrected in response to an operation of an operator;

means for detecting an overlap of the additional symbol after the corrected display position is created with another additional symbol and/or the dimension-relating symbol;

wherein, after the overlap is detected, the means for correcting the display position of the additional symbol corrects the display position of the additional symbol with respect to both the dimension-relating symbol and the another additional symbol.

2. The graphic form correction apparatus according to claim 1, wherein the dimension-relating symbol is a dimension line, an extension line or a dimension value.

3. The graphic form correction apparatus according to claim 1, wherein the additional symbol is a finish symbol or a surface roughness value.

4. The graphic form correction apparatus according to claim 1, further comprising means for controlling a display section, said display section displaying each of said additional symbol, said another additional symbol, and said dimension-relating symbol.

5. The graphic form correction apparatus according to claim 1, further comprising means for controlling a display section, said display section displaying each of said additional symbol, said another additional symbol, and said dimension-relating symbol.

6. A graphic form correction method for a CAD system wherein a display position of a dimension-relating symbol in a coordinate relationship to a line segment being entered on a two-dimensional graphic form is automatically corrected and creates a corrected display position in response to a two-dimensional corrected graphic form, said method comprising the steps of:

creating a corrected display position of the dimension-relating symbol;

arranging an additional symbol which is separate from and in the proximity of the dimension-relating symbol, wherein said additional symbol is not the dimension-relating symbol;

storing both the display position of the additional symbol and the display position of the dimension-relating symbol in the coordinate relationship with the line segment;

correcting the display position of the dimension-relating symbol in response to the two-dimensional corrected graphic form;

correcting the display position of the additional symbol based on the corrected display position of the dimension-relating symbol after the two-dimensional corrected graphic form; and detecting an overlap of the additional symbol after the corrected display position is created with another additional symbol and/or the dimension-relating symbol, wherein, after the overlap is detected, the step of correcting the display position of the additional symbol correcting the display position of the additional symbol with respect to both the dimension-relating symbol and the another additional symbol.

7. The graphic form correction method according to claim 6, wherein the dimension-relating symbol is a dimension line, an extension line or a dimension value.

8. The graphic form correction method according to claim 6, wherein the additional symbol is a finish symbol or a surface roughness value.

9. The graphic form correction method according to claim 6, further comprising the additional step of controlling a display section, said display section displaying each of said additional symbol, said another additional symbol, and said dimension-relating symbol.

10. A graphic form correction apparatus for a CAD system, wherein a display position of a dimension-relating symbol in a coordinate relationship to a line segment being entered on a two-dimensional graphic form is automatically corrected and results in a corrected display position in response to a two-dimensional corrected graphic form, said apparatus comprising:

a display section;

an internal storage apparatus storing a main operating program and a plurality of image data;

a CPU and a user interface;

a ROM and a RAM; and an additional symbol arrangement section for arranging an additional symbol separate from and in the proximity of the dimension-relating symbol, wherein said additional symbol is not a dimension-relating symbol;

a display position storage section storing both the display position of the additional symbol and the display position of the dimension-relating symbol in the coordinate relationship with the line segment;

a display position correction section responsive to the corrected display position of the dimension-relating symbol after the two-dimensional corrected graphic form; and an overlap detection section, said overlap detection section detecting an overlap of the additional symbol after the corrected display position is created with another additional symbol and/or the dimension-relating symbol, wherein, after the overlap is detected, the display position correction section corrects the display position of the additional symbol with respect to both the dimension-relating symbol and the another additional symbol.

* * * * *